(12) United States Patent
Hashimoto et al.

(10) Patent No.: US 11,014,572 B2
(45) Date of Patent: May 25, 2021

(54) AUTONOMOUS DRIVING SYSTEM

(71) Applicant: TOYOTA JIDOSHA KABUSHIKI KAISHA, Toyota (JP)

(72) Inventors: Ryuta Hashimoto, Susono (JP); Yoshinori Watanabe, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 16/204,619

(22) Filed: Nov. 29, 2018

(65) Prior Publication Data

US 2019/0225236 A1 Jul. 25, 2019

(30) Foreign Application Priority Data

Jan. 24, 2018 (JP) .............................. JP2018-009626

(51) Int. Cl.
*B60W 50/08* (2020.01)
*G05D 1/00* (2006.01)
(Continued)

(52) U.S. Cl.
CPC ............ *B60W 50/08* (2013.01); *B60W 10/04* (2013.01); *B60W 30/09* (2013.01); *B60W 30/18* (2013.01); *B60W 30/18163* (2013.01); *B60W 40/08* (2013.01); *B60W 40/09* (2013.01); *G05D 1/0088* (2013.01); *B60W 2040/0818* (2013.01); *B60W 2540/26* (2013.01); *B60W 2540/30* (2013.01); *B60W 2710/30* (2013.01); *B60W 2720/106* (2013.01); *B60W 2900/00* (2013.01); *G05D 2201/0213* (2013.01)

(58) Field of Classification Search
CPC ...... B60W 50/08; B60W 40/09; B60W 10/04; B60W 30/18163; B60W 2710/30; B60W 2540/30; B60W 2720/106; B60W 2900/00; B60W 2040/0818; B60W 2540/26; B60W 40/08; B60W 30/09; B60W 30/18; G05D 1/0088; G05D 2201/0213; D05D 1/0088
See application file for complete search history.

(56) References Cited

U.S. PATENT DOCUMENTS 9,701,307 B1 * 7/2017 Newman ............. B60W 10/184
2005/0200467 A1 * 9/2005 Au ........................ B60Q 1/343
340/465
(Continued)

FOREIGN PATENT DOCUMENTS

| JP | 2012-121524 A | 6/2012 |
| JP | 2016-038768 A | 3/2016 |

(Continued)

*Primary Examiner* — Sze-Hon Kong
(74) *Attorney, Agent, or Firm* — Sughrue Mion, PLLC

(57) ABSTRACT

An autonomous driving system mounted on a vehicle includes: a vehicle behavior control device configured to perform vehicle behavior control that controls behavior of the vehicle; and an awareness level calculation device configured to calculate an awareness level of a driver of the vehicle. A low awareness state is a state where the awareness level is lower than a normal state. The vehicle behavior control device performs the vehicle behavior control such that another vehicle around the vehicle predicts or recognizes the behavior of the vehicle more easily in a case of the low awareness state than in a case of the normal state.

5 Claims, 9 Drawing Sheets

(51) Int. Cl.
*B60W 40/09* (2012.01)
*B60W 10/04* (2006.01)
*B60W 30/18* (2012.01)
*B60W 30/09* (2012.01)
*B60W 40/08* (2012.01)

(56) References Cited

U.S. PATENT DOCUMENTS

| | | | | |
|---|---|---|---|---|
| 2011/0106376 | A1* | 5/2011 | Tijerina | B60Q 1/40 |
| | | | | 701/36 |
| 2012/0089300 | A1* | 4/2012 | Wolterman | G08G 1/09 |
| | | | | 701/36 |
| 2016/0041553 | A1 | 2/2016 | Sato et al. | |
| 2016/0071418 | A1* | 3/2016 | Oshida | B60W 30/165 |
| | | | | 701/23 |
| 2017/0248952 | A1* | 8/2017 | Perkins | G05D 1/0061 |
| 2017/0341652 | A1* | 11/2017 | Sugawara | B60W 30/095 |
| 2018/0029604 | A1 | 2/2018 | Niino et al. | |
| 2018/0037216 | A1 | 2/2018 | Otake | |
| 2018/0218230 | A1* | 8/2018 | Naka | B60W 50/08 |
| 2018/0312164 | A1* | 11/2018 | Sasabuchi | B60W 30/17 |
| 2019/0061761 | A1* | 2/2019 | Tsuchiya | B60W 50/0098 |
| 2019/0061766 | A1* | 2/2019 | Nishiguchi | B60W 30/18163 |
| 2019/0092346 | A1* | 3/2019 | Odate | B62D 6/007 |
| 2019/0100136 | A1* | 4/2019 | Arai | B60Q 1/44 |
| 2019/0263395 | A1* | 8/2019 | Hoetzer | B60W 50/0097 |
| 2019/0329791 | A1* | 10/2019 | Oba | B60W 50/14 |
| 2019/0344790 | A1* | 11/2019 | Kitagawa | G05D 1/0061 |
| 2020/0283021 | A1* | 9/2020 | Horii | B60W 30/18018 |

FOREIGN PATENT DOCUMENTS

| | | |
|---|---|---|
| JP | 2016-149122 A | 8/2016 |
| JP | 2018-022365 A | 2/2018 |

* cited by examiner

AUTONOMOUS DRIVING SYSTEM

BACKGROUND

Technical Field

The present disclosure relates to an autonomous driving system that controls autonomous driving of a vehicle.

Background Art

Patent Literature 1 discloses a vehicle control device that is capable of switching between autonomous driving and manual driving of a vehicle. When switching from the autonomous driving to the manual driving, the vehicle control device notifies a driver that the autonomous driving will end. Here, the vehicle control device calculates a degree of manual driving adaptation of the driver based on a driver state, and makes the notification timing earlier as the degree of manual driving adaptation is lower.

LIST OF RELATED ART

Patent Literature 1: Japanese Unexamined Patent Application Publication No. JP-2016-38768

SUMMARY

During autonomous driving of a vehicle, an autonomous driving system requests a driver to perform an operation or monitoring of a surrounding situation, as needed. However, when an awareness level of the driver is low, the driver cannot respond to the operation request or the monitoring request from the autonomous driving system or takes long to respond.

An object of the present disclosure is to provide a technique that can reduce need for an operation or monitoring by a driver when an awareness level of the driver is low during autonomous driving of a vehicle.

A first disclosure is directed to an autonomous driving system mounted on a vehicle.

The autonomous driving system includes:

a vehicle behavior control device configured to perform vehicle behavior control that controls behavior of the vehicle; and an awareness level calculation device configured to calculate an awareness level of a driver of the vehicle.

A low awareness state is a state where the awareness level is lower than a normal state.

The vehicle behavior control device performs the vehicle behavior control such that another vehicle around the vehicle predicts or recognizes the behavior of the vehicle more easily in a case of the low awareness state than in a case of the normal state.

A second disclosure further has the following feature in addition to the first disclosure.

A target acceleration or deceleration is a target value of an acceleration or deceleration of the vehicle in the vehicle behavior control.

The vehicle behavior control device sets the target acceleration or deceleration in the case of the low awareness state to be lower than that in the case of the normal state.

A third disclosure further has the following feature in addition to the first disclosure.

A deceleration start position is a position to start deceleration of the vehicle.

The vehicle behavior control device sets the deceleration start position in the case of the low awareness state to be in front of that in the case of the normal state.

A fourth disclosure further has the following feature in addition to the first disclosure.

The vehicle behavior control device performs the vehicle behavior control such that said another vehicle predicts or recognizes a lane change of the vehicle more easily in the case of the low awareness state than in the case of the normal state.

A fifth disclosure further has the following feature in addition to the fourth disclosure.

A lane change time is a target time from start to completion of the lane change.

The vehicle behavior control device increases the lane change time in the case of the low awareness state as compared with the case of the normal state.

A sixth disclosure further has the following feature in addition to the fourth disclosure.

The lane change includes turn signal flashing.

The vehicle behavior control device increases a duration or a continuation range of the turn signal flashing in the case of the low awareness state as compared with the case of the normal state.

A seventh disclosure further has the following feature in addition to the fourth disclosure.

The vehicle behavior control device performs steering control such that the vehicle moves to an adjacent lane beyond a lane boundary during the lane change.

A lane boundary distance is a distance between the vehicle before starting the steering control and the lane boundary.

The vehicle behavior control device sets the lane boundary distance in the case of the low awareness state to be smaller than that in the case of the normal state.

According to the present disclosure, the vehicle behavior control device performs the vehicle behavior control such that another vehicle predicts or recognizes the behavior of the vehicle more easily in the case of the low awareness state than in the case of the normal state. Since another vehicle predicts or recognizes the behavior of the vehicle with a higher degree of accuracy, possibility that another vehicle comes too close to the vehicle and/or collides with the vehicle decreases. Therefore, opportunity for the autonomous driving system mounted on the vehicle to issue an operation request or a monitoring request to the driver decreases. As a result, need for the operation or monitoring by the driver decreases.

EMBODIMENTS

Embodiments of the present disclosure will be described below with reference to the attached drawings.

1. Outline

Figure 1:
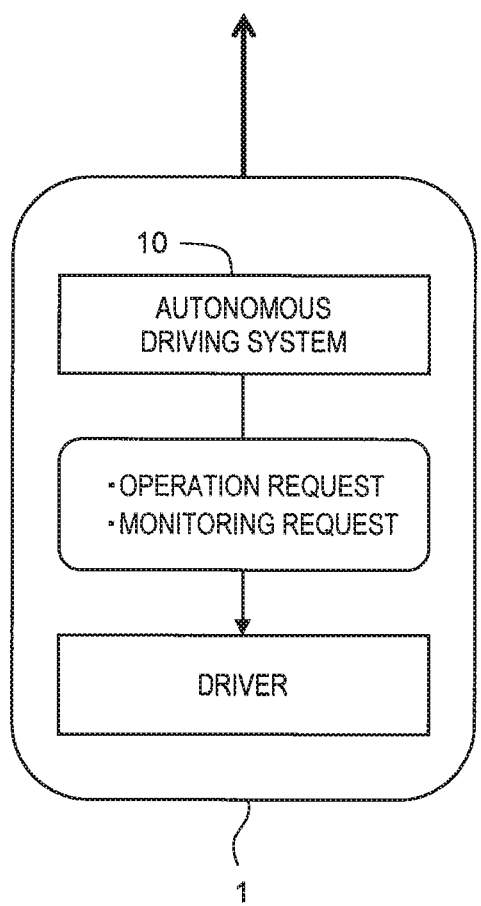
FIG. 1 is a conceptual diagram for explaining an autonomous driving system according to an embodiment of the present disclosure.

FIG. 1 is a conceptual diagram for explaining an autonomous driving system 10 according to the present embodiment. The autonomous driving system 10 is mounted on a vehicle 1 and controls autonomous driving of the vehicle 1. For example, the autonomous driving system 10 controls behavior of the vehicle 1 during the autonomous driving.

Moreover, during the autonomous driving, the autonomous driving system 10 requests a driver of the vehicle 1 to perform an operation or monitoring of a surrounding situation, as needed. For example, when there is an event (e.g. road work zone, congested zone, complex terrain, etc.) that is hard to handle by the autonomous driving, the autonomous driving system 10 may request the driver to start a manual driving operation. As another example, when a surrounding vehicle is close to the vehicle 1, the autonomous driving system 10 may request the driver to perform monitoring so that the driver can immediately take over the driving if needed. In order to achieve smooth vehicle travel, it is desirable that the driver quickly responds to the operation request or the monitoring request from the autonomous driving system 10.

Here, let us consider an "awareness level AL" of the driver. The awareness level AL represents a degree of perception (consciousness) of the driver. When the awareness level AL is high, the driver is able to quickly respond to the operation request or the monitoring request from the autonomous driving system 10. On the other hand, the awareness level AL is low in such situations as the driver is absent-minded, feels drowsy, is sleeping, and the like. When the awareness level AL is low, the driver cannot respond to the operation request or the monitoring request from the autonomous driving system 10 or takes long to respond. This is not desirable in terms of the smooth vehicle travel.

In view of the above, the present embodiment provides a technique that can reduce need for the operation or monitoring by the driver when the awareness level AL of the driver is low. In order to reduce the need for the operation or monitoring by the driver, the autonomous driving system 10 actively creates a situation where the operation request or the monitoring request from the autonomous driving system 10 is suppressed. To that end, the autonomous driving system 10 according to the present embodiment controls the behavior of the vehicle 1 according to the awareness level AL of the driver.

Figure 2:
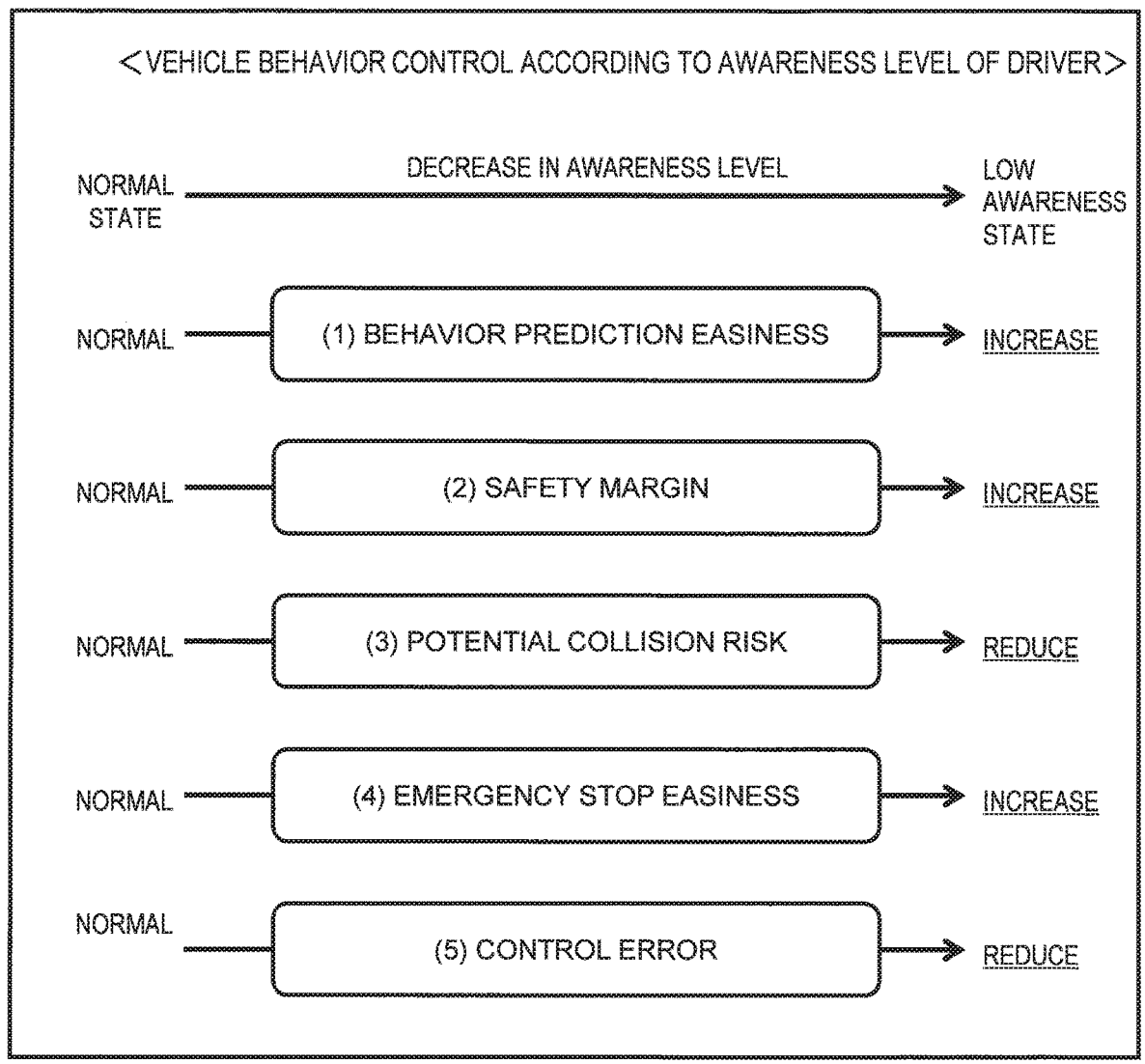
FIG. 2 is a conceptual diagram for explaining an outline of vehicle behavior control by the autonomous driving system according to the embodiment of the present disclosure.

FIG. 2 is a conceptual diagram for explaining an outline of vehicle behavior control by the autonomous driving system 10 according to the present embodiment. In FIG. 2, a "low awareness state" means a state where the awareness level AL is lower than a normal state. For example, the low awareness state is a state where the awareness level AL is lower than a threshold, and the normal state is a state where the awareness level AL is equal to or higher than the threshold. In the case of the low awareness state, the autonomous driving system 10 performs the vehicle behavior control based on at least one of the following standpoints, in order to suppress the operation request or the monitoring request.

(1) Increase in Behavior Prediction Easiness

The autonomous driving system 10 performs the vehicle behavior control such that another vehicle around the vehicle 1 predicts or recognizes the behavior of the vehicle 1 more easily in the case of the low awareness state than in the case of the normal state. Easiness for another vehicle around the vehicle 1 to predict or recognize the behavior of the vehicle 1 is hereinafter referred to as "behavior prediction easiness". The autonomous driving system 10 performs the vehicle behavior control such that the behavior prediction easiness in the case of the low awareness state increases as compared with the case of the normal state. Increase in the behavior prediction easiness causes another vehicle to predict or recognize the behavior of the vehicle 1 with a higher degree of accuracy, which results in decrease in possibility that another vehicle comes too close to the vehicle 1 and/or collides with the vehicle 1. Therefore, opportunity for the autonomous driving system 10 mounted on the vehicle 1 to issue the operation request or the monitoring request to the driver decreases. As a result, need for the operation or monitoring by the driver decreases.

(2) Increase in Safety Margin

The autonomous driving system 10 performs the vehicle behavior control such that a safety margin for a surrounding object becomes larger in the case of the low awareness state than in the case of the normal state. In other words, the autonomous driving system 10 increases the safety margin in the case of the low awareness state as compared with the case of the normal state. For example, the autonomous driving system 10 sets an inter-vehicle distance in the case of the low awareness state to be larger than that in the case of the normal state. Due to increase in the safety margin for the surrounding object, possibility of collision with the surrounding object is reduced. Therefore, opportunity for the autonomous driving system 10 to issue the operation request or the monitoring request to the driver decreases. As a result, need for the operation or monitoring by the driver decreases.

(3) Reduction of Potential Collision Risk

For example, in a situation where a merge lane merges with a first lane of a main line, collision occurrence probability is potentially high near the lane merging point in the first lane. Therefore, traveling in a lane other than the first lane near the lane merging point can reduce collision risk. In the case of the low awareness state, the autonomous driving system 10 performs the vehicle behavior control such that potential collision risk is reduced as compared with the case of the normal state. Accordingly, opportunity for the autonomous driving system 10 to issue the operation request or the monitoring request to the driver decreases. As a result, need for the operation or monitoring by the driver decreases.

(4) Increase in Emergency Stop Easiness

When an emergency (e.g. mechanical trouble of the vehicle 1, abnormality of the autonomous driving system 10) occurs, the autonomous driving system 10 requests the driver to start the manual driving operation. However, in the case of the low awareness state where the driver may not respond to the manual driving request, the autonomous driving system 10 brings the vehicle 1 to an emergency stop without issuing the manual driving request. In view of the above, in the case of the low awareness state, the autonomous driving system 10 selects a travel lane in which the vehicle 1 can be easily brought to a stop in case of the emergency. That is to say, in the case of the low awareness state, the autonomous driving system 10 performs the vehicle behavior control such that emergency stop easiness increases as compared with the case of the normal state. As a result, even if the emergency occurs, it is possible to easily bring the vehicle 1 to a stop without relying on the driver's manual driving. Therefore, need for the operation or monitoring by the driver decreases.

(5) Reduction of Control Error

If a control error in the vehicle behavior control by the autonomous driving system 10 increases, driver intervention becomes more likely to be required. In view of the above, in the case of the low awareness state, the autonomous driving system 10 changes a control gain such that the control error is reduced. As a result, possibility of the driver intervention due to the control error decreases. That is, need for the operation or monitoring by the driver decreases.

The autonomous driving system 10 according to the present embodiment performs the vehicle behavior control based on at least one of the standpoints exemplified above. As a result, it is possible to reduce the need for the operation or monitoring by the driver when the awareness level AL of the driver is low during the autonomous driving of the vehicle 1. Hereinafter, a configuration of and processing by the autonomous driving system 10 according to the present embodiment will be described in more detail.

2. Autonomous Driving System 2-1. Overall Configuration Example

Figure 3:
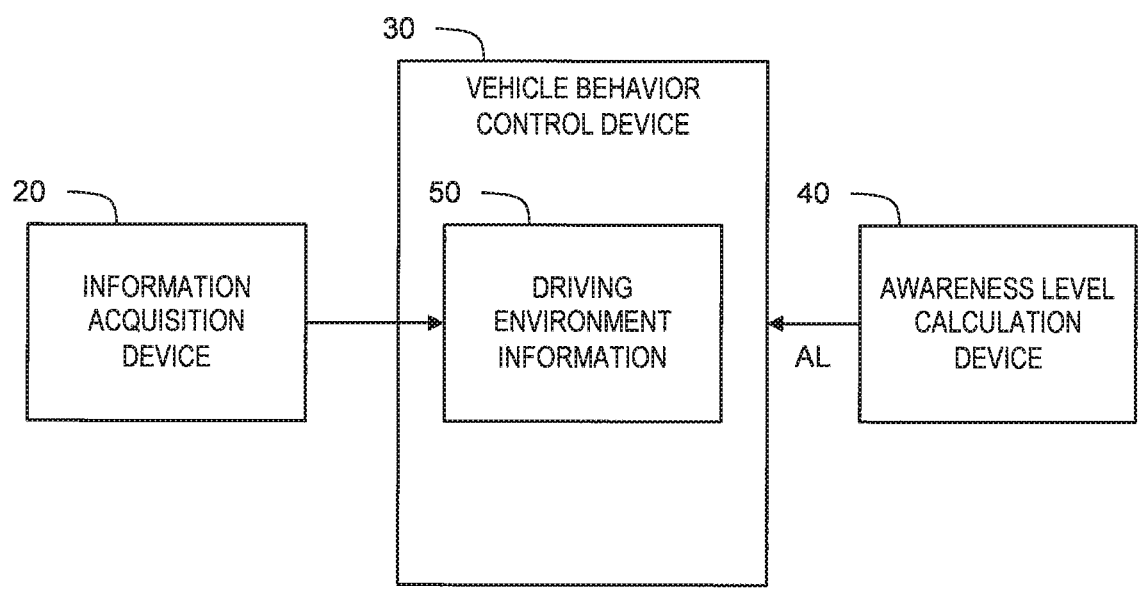
FIG. 3 is a block diagram schematically showing a configuration of the autonomous driving system according to the embodiment of the present disclosure.

FIG. 3 is a block diagram schematically showing a configuration of the autonomous driving system 10 according to the present embodiment. The autonomous driving system 10 includes an information acquisition device 20, a vehicle behavior control device 30, and an awareness level calculation device 40.

The information acquisition device 20 acquires driving environment information 50 indicating driving environment for the vehicle 1. Based on the driving environment information 50, the vehicle behavior control device 30 controls behavior of the vehicle 1 during the autonomous driving. The awareness level calculation device 40 calculates the awareness level AL of the driver of the vehicle 1. The vehicle behavior control device 30 performs the vehicle behavior control according to the awareness level AL.

Figure 4:
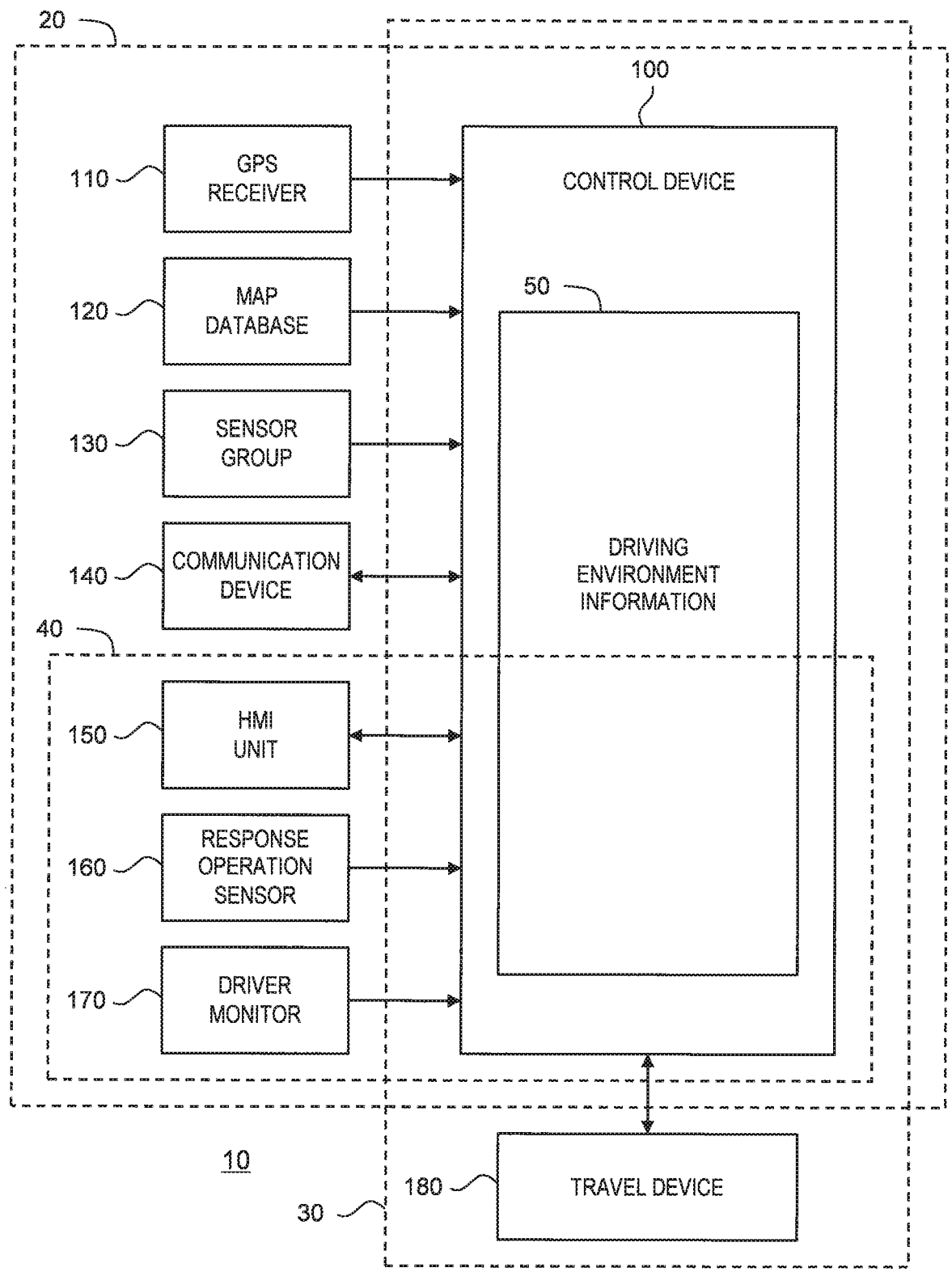
FIG. 4 is a block diagram showing a concrete configuration example of the autonomous driving system according to the embodiment of the present disclosure.

FIG. 4 is a block diagram showing a concrete configuration example of the autonomous driving system 10. The autonomous driving system 10 is provided with a control device 100, a GPS (Global Positioning System) receiver 110, a map database 120, a sensor group 130, a communication device 140, an HMI (Human Machine Interface) unit 150, a response operation sensor 160, a driver monitor 170, and a travel device 180.

The control device 100 controls the autonomous driving of the vehicle 1. The control device 100 is a microcomputer including a processor and a memory device. The control device 100 is also called an ECU (Electronic Control Unit). The autonomous driving control by the control device 100 is achieved by the processor executing a control program stored in the memory device.

The GPS receiver 110 receives signals transmitted from a plurality of GPS satellites and calculates a position and an orientation of the vehicle 1 based on the received signals.

Map information is recorded in the map database 120. The map information includes information of lane geometries, lane attributes (e.g. slower traffic lane, speed limit), autonomous driving permitted zones, and the like.

The sensor group 130 detects a situation around the vehicle 1 and a state of the vehicle 1. The sensor group 130 is exemplified by a LIDAR (Laser Imaging Detection and Ranging), a radar, and a camera. In addition, the sensor group 130 includes a vehicle state sensor that detects a state of the vehicle 1. The vehicle state sensor includes a vehicle speed sensor that detects a speed of the vehicle 1, an abnormality detection sensor that detects abnormality of the vehicle 1, and the like.

The communication device 140 communicates with the outside of the vehicle 1. For example, the communication device 140 performs a V2I communication (a vehicle-to-infrastructure communication) and a V2V communication (a vehicle-to-vehicle communication). In addition, the communication device 140 may communicate with a management server managing autonomous driving service through a communication network.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like.

The response operation sensor 160 is a sensor for detecting a response operation by the driver responding to the operation request. For example, the response operation sensor 160 includes a steering wheel touch sensor for detecting whether or not the driver is holding a steering wheel. The response operation sensor 160 may include sensors for detecting a steering operation, an acceleration operation, and a braking operation, respectively.

The driver monitor 170 detects a state of the driver through imaging. More specifically, the driver monitor 170 includes an imaging device such as an infrared camera. The driver monitor 170 is capable of detecting various kinds of the state of the driver by analyzing an image obtained by the imaging device. For example, the driver monitor 170 can detect an orientation of a face, a direction of eyes, and an eye opening/closing degree of the driver.

The travel device 180 includes a steering device, a driving device, a braking device, and a turn signal. The steering device turns wheels. The driving device is a power source that generates a driving force. The driving device is exemplified by an engine and an electric motor. The braking device generates a braking force.

2-2. Information Acquisition Device

The control device 100 acquires the driving environment information 50 by using the GPS receiver 110, the map database 120, the sensor group 130, the communication device 140, the HMI unit 150, the response operation sensor 160, and the driver monitor 170.

Figure 5:
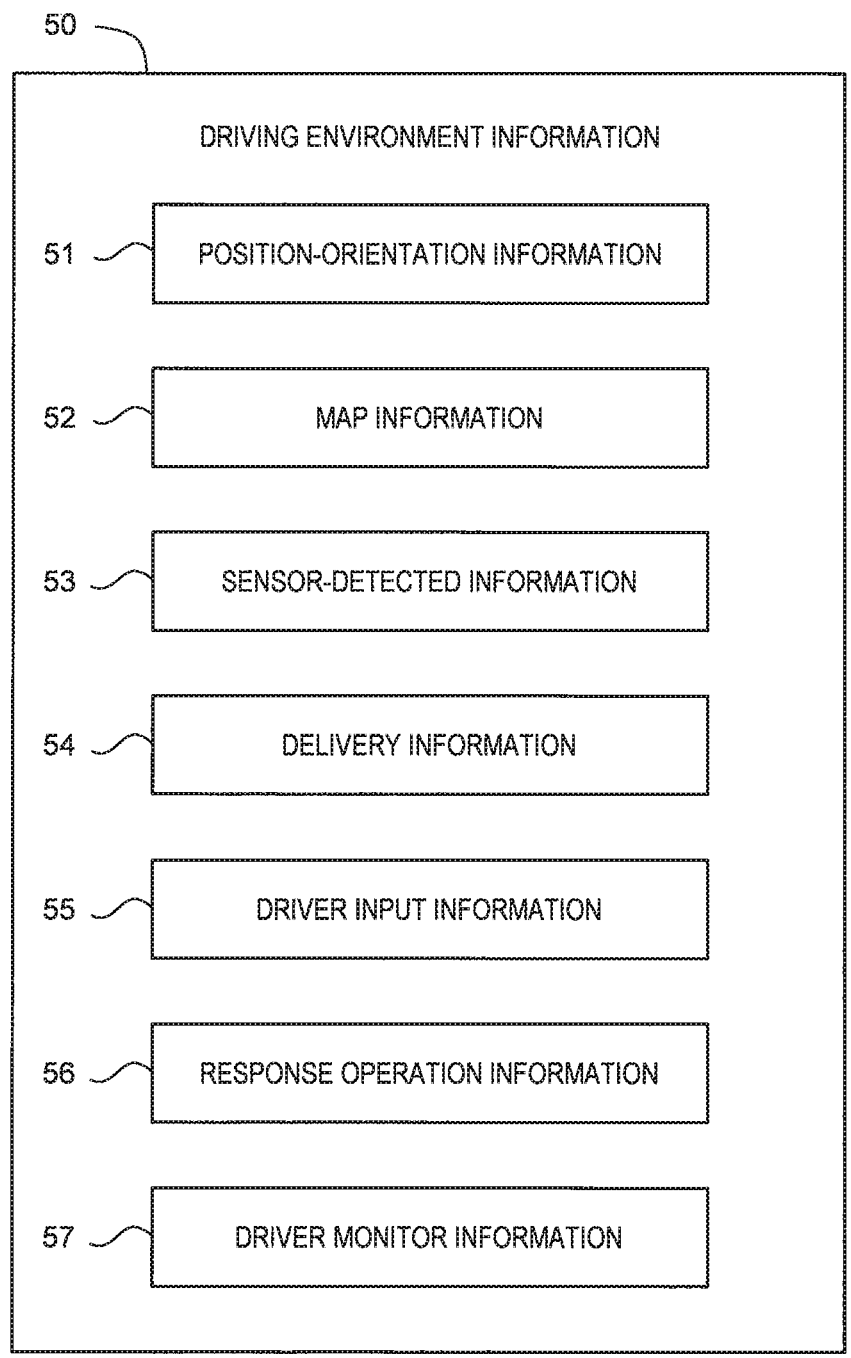
FIG. 5 is a block diagram showing an example of driving environment information used in the autonomous driving system according to the embodiment of the present disclosure.

FIG. 5 shows an example of the driving environment information 50 in the present embodiment. The driving environment information 50 includes position-orientation information 51, map information 52, sensor-detected information 53, delivery information 54, driver input information 55, response operation information 56, and driver monitor information 57.

The position-orientation information 51 indicates the position and the orientation of the vehicle 1. The control device 100 acquires the position-orientation information 51 from the GPS receiver 110.

The map information 52 includes information of lane geometries, lane attributes (e.g. slower traffic lane, speed limit), autonomous driving permitted zones, and the like. The control device 100 acquires the map information 52 around the vehicle 1 based on the position-orientation information 51 and the map database 120.

The sensor-detected information 53 is information acquired based on a result of detection by the sensor group 130. More specifically, the sensor-detected information 53 includes target information regarding a target around the vehicle 1. The target around the vehicle 1 is exemplified by a surrounding vehicle, a fallen object, a white line, a roadside structure, a sign, and so forth. The target information includes a relative position, a relative speed, and the like of the detected target as seen from the vehicle 1. In addition, the sensor-detected information 53 includes the state of the vehicle 1 detected by the vehicle state sensor. The control device 100 acquires the sensor-detected information 53 based on the result of detection by the sensor group 130.

The delivery information 54 is information acquired through the communication device 140. For example, the delivery information 54 includes road traffic information (traffic jam information, road work zone information, accident information, traffic regulation information, and the like) delivered from an infrastructure. The delivery information 54 may include information delivered from the management server managing the autonomous driving service. The control device 100 acquires the delivery information 54 by using the communication device 140 to communicate with the outside of the vehicle 1.

The driver input information 55 is information input by the driver through the HMI unit 150.

The response operation information 56 is information indicating the response operation by the driver detected by the response operation sensor 160. For example, the response operation information 56 indicates whether or not the driver holds the steering wheel.

The driver monitor information 57 is information acquired by the driver monitor 170. For example, the driver monitor information 57 indicates the orientation of the face, the direction of eyes, and the eye opening/closing degree of the driver.

It can be said that the control device 100, the GPS receiver 110, the map database 120, the sensor group 130, the communication device 140, the HMI unit 150, the response operation sensor 160, and the driver monitor 170 constitute the "information acquisition device 20" shown in FIG. 3.

2-3. Vehicle Behavior Control Device

The control device 100 controls the autonomous driving of the vehicle 1 based on the driving environment information 50. In particular, the control device 100 performs the vehicle behavior control that controls the behavior of the vehicle 1 based on the driving environment information 50. More specifically, the control device 100 creates a vehicle behavior plan (travel plan) based on the driving environment information 50. Then, the control device 100 controls the travel device 180 to make the vehicle 1 travel in accordance with the vehicle behavior plan. It can be said that the control device 100 and the travel device 180 constitute the "vehicle behavior control device 30" shown in FIG. 3.

2-4. Awareness Level Calculation Device

Furthermore, the control device 100 calculates the awareness level AL of the driver. More specifically, the control device 100 can calculate the awareness level AL based on the driver monitor information 57. For example, the awareness level AL is calculated to be lower as the eye opening degree of the driver becomes smaller. As another example, the awareness level AL is calculated to be lower as an angle between the orientation of the face of the driver and a front direction becomes larger.

Figure 6:
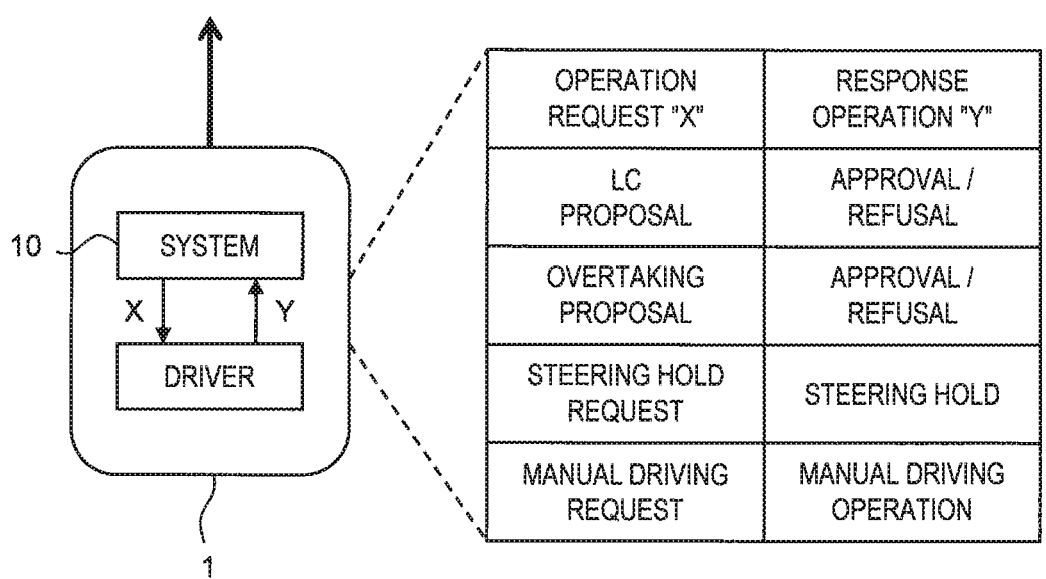
FIG. 6 is a conceptual diagram showing various examples of combination of an operation request and a response operation in the embodiment of the present disclosure.

As still another example, the control device 100 can calculate the awareness level AL based on the operation request and the response operation. The operation request is not limited only to the manual driving request described above. To generalize, the "operation request" makes a request or a proposal to the driver and urges the driver to perform the "response operation" responding to the request or the proposal. FIG. 6 shows various example of combination of the operation request (X) and the response operation (Y).

For example, the control device 100 proposes to make a lane change (LC: Lane Change). A situation requiring the lane change is exemplified by lane branching and lane merging. The lane branching and the lane merging can be recognized based on the map information 52. The control device 100 uses the HMI unit 150 (the output device) to make a lane change proposal. The driver uses the HMI unit 150 (the input device) to approve or refuse the lane change proposal. That is to say, the "lane change proposal" is the operation request, and the response operation responding thereto is "approval/refusal". The control device 100 can determine, based on the driver input information 55, whether or not "approval/refusal" is performed.

As another example, the control device 100 proposes to overtake a low-speed preceding vehicle. The low-speed preceding vehicle can be recognized based on the sensor-detected information 53 (specifically, the target information and the vehicle speed information). As in the case of the lane change proposal, the control device 100 makes an overtaking proposal, and the driver approves or refuses the overtaking proposal. That is to say, the "overtaking proposal" is the operation request, and the response operation responding thereto is "approval/refusal". The control device 100 can determine, based on the driver input information 55, whether or not "approval/refusal" is performed.

As still another example, the control device 100 requests the driver to hold the steering wheel. Holding the steering wheel is hereinafter referred to as "steering hold". For example, when there is a sharp curve ahead of the vehicle 1, the control device 100 requests the driver to perform the steering hold, in view of possibility of lane departure. The sharp curve can be recognized based on the map information 52 (specifically, the lane geometry information). The driver performs the steering hold in response to the steering hold request. That is to say, the "steering hold request" is the operation request, and the response operation responding thereto is the "steering hold". The control device 100 can determine, based on the response operation information 56, whether or not the steering hold is performed.

As still another example, the control device 100 requests the driver to start manual driving. Examples of a situation requiring the manual driving are as follows: (a) the vehicle 1 arrives near a destination; (b) the autonomous driving permitted zone ends; (c) there is an event (e.g. road work zone, congested zone, complex terrain) that is hard to handle by the autonomous driving; and so forth. The situations (a) and (b) can be recognized based on the position-orientation information 51 and the map information 52. The road work zone and the congested zone can be recognized based on the delivery information 54. The complex terrain can be recognized based on the map information 52. In response to the manual driving request, the driver performs a manual driving operation (e.g. the steering hold, a steering operation, an acceleration operation, a braking operation). That is to say, the "manual driving request" is the operation request, and the response operation responding thereto is the "manual driving operation". The control device 100 can determine, based on the response operation information 56, whether or not the manual driving operation is performed.

The control device 100 measures a response time from issuance of the operation request to detection of the response operation. Then, the control device 100 calculates the awareness level AL of the driver based on the response time. More specifically, the awareness level AL is calculated to be lower as the response time becomes longer.

It can be said that the control device 100, the HMI unit 150, the response operation sensor 160, and the driver monitor 170 constitute the "awareness level calculation device 40" shown in FIG. 3.

2-5. Process Flow

Figure 7:
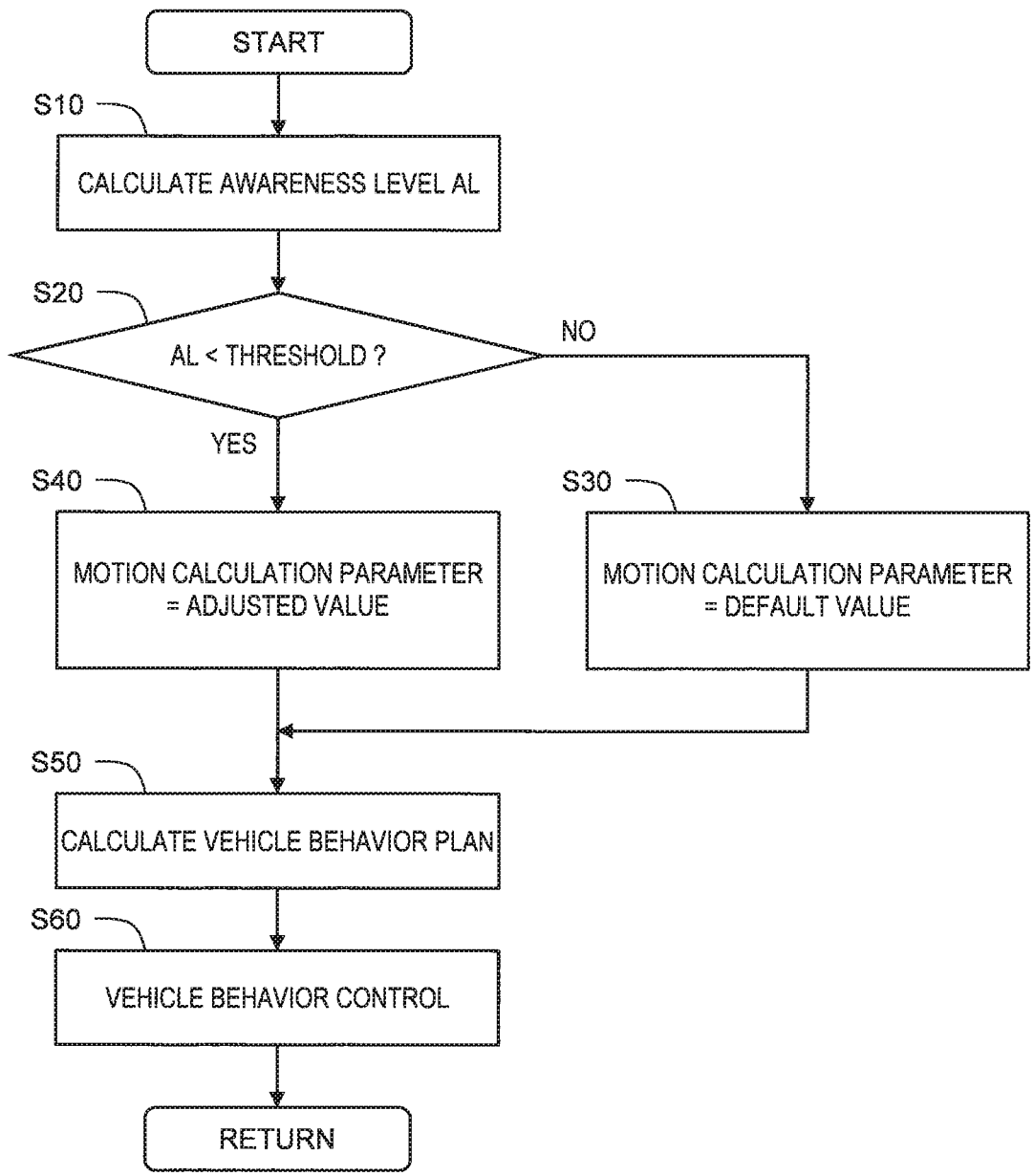
FIG. 7 is a flow chart showing processing by a control device of the autonomous driving system according to the embodiment of the present disclosure.

FIG. 7 is a flow chart showing processing by the control device 100 of the autonomous driving system 10 according to the present embodiment. The flow shown in FIG. 7 is repeatedly executed every certain cycle.

In Step S10, the control device 100 (the awareness level calculation device 40) calculates the awareness level AL. In the subsequent Step S20, the control device 100 (the vehicle behavior control device 30) compares the awareness level AL with a threshold.

When the awareness level AL is equal to or higher than the threshold (Step S20; No), the control device 100 sets a motion calculation parameter to a "default value" (Step S30). The motion calculation parameter is used in the subsequent Step S50 (calculation of a vehicle behavior plan). The motion calculation parameter is exemplified by setting values of a target acceleration/deceleration, an acceleration/deceleration start timing, and so forth. On the other hand, when the awareness level AL is lower than the threshold (Step S20; Yes), the control device 100 changes the motion calculation parameter to an "adjusted value" different from the default value (Step S40).

In Step S50, the control device 100 (the vehicle behavior control device 30) uses the motion calculation parameter to calculate a vehicle behavior plan. The vehicle behavior plan includes a target trajectory (a target position and a target speed) of the vehicle 1 in the autonomous driving. In Step S60, the control device 100 controls the travel device 180 to make the vehicle 1 travel in accordance with the vehicle behavior plan.

3. Increase in Behavior Prediction Easiness

Next, let us describe the standpoint (1) shown in FIG. 2 in more detail. The control device 100 (i.e. the vehicle behavior control device 30) 10 performs the vehicle behavior control such that another vehicle around the vehicle 1 predicts or recognizes the behavior of the vehicle 1 more easily in the case of the low awareness state than in the case of the normal state. In other words, the control device 100 performs the vehicle behavior control such that the behavior prediction easiness in the case of the low awareness state increases as compared with the case of the normal state. Hereinafter, various examples for increasing the behavior prediction easiness will be described.

3-1. First Example

If the vehicle 1 rapidly accelerates or decelerates, it is difficult for another vehicle to predict how the vehicle 1 moves thereafter. Moreover, if the vehicle 1 rapidly accelerates or decelerates and thereby a distance between the vehicle 1 and another vehicle rapidly decreases, said another vehicle needs to immediately perform avoidance control in order to avoid collision. In this case, it is not possible to secure a sufficient data analysis time for predicting or recognizing the behavior of the vehicle 1. As a result, it becomes difficult for said another vehicle to predict or recognize the behavior of the vehicle 1.

Therefore, the control device 100 sets "a target acceleration or deceleration" in the case of the low awareness state to be lower than that in the case of the normal state. The target acceleration or deceleration is a target value of an acceleration or deceleration of the vehicle 1 in the vehicle behavior control, and is an example of the above-described motion calculation parameter. That is, the adjusted value of the target acceleration or deceleration is lower than the default value. Since the target acceleration or deceleration becomes lower, the vehicle 1 gently accelerates or decelerates. As a result, the behavior prediction easiness increases.

3-2. Second Example

Figure 8:
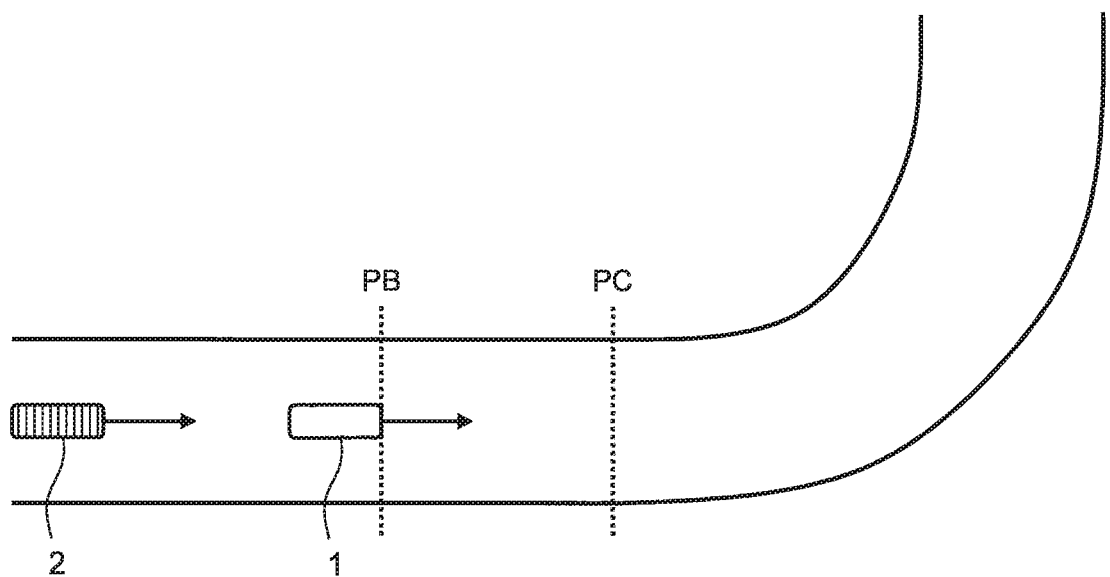
FIG. 8 is a conceptual diagram for explaining the vehicle behavior control by the autonomous driving system according to the embodiment of the present disclosure.

In a second example, let us consider a position to start deceleration of the vehicle 1. For instance, FIG. 8 shows a situation where the vehicle 1 performs deceleration in front of a curve. The curve starts at a position PC ahead of the vehicle 1. The vehicle 1 starts deceleration at a deceleration start position PB in front of the curve start position PC.

For example, the control device 100 calculates the deceleration start position PB based on a current vehicle speed, a target speed at the curve start position PC, and the target deceleration. When the target deceleration is set to be lower as in the first example described above, the deceleration start position PB is set to be in front of that in the case of the normal state.

As another example, the control device 100 may first set the deceleration start position PB and then calculate the target deceleration. In this case, the control device 100 sets the deceleration start position PB in the case of the low awareness state to be in front of that in the case of the normal state. As a result, the target deceleration in the case of the low awareness state becomes lower than the case of the normal state.

In either example, the behavior prediction easiness increases as in the case of the first example. Moreover, when the deceleration start position PB moves upstream, a turn-on timing of a taillight of the vehicle 1 becomes earlier. As a result, intention to decelerate the vehicle 1 is transferred to a following vehicle 2 earlier. This also contributes to increase in the behavior prediction easiness.

3-3. Third Example

Figure 9:
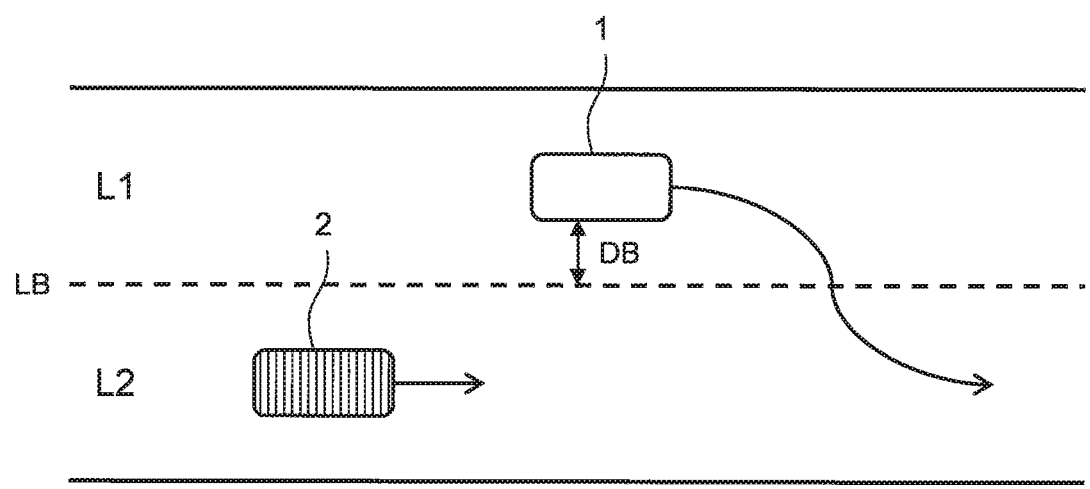
FIG. 9 is a conceptual diagram for explaining the vehicle behavior control by the autonomous driving system according to the embodiment of the present disclosure.

In a third example, let us consider a case where the vehicle 1 makes a lane change. FIG. 9 is a diagram for explaining a lane change of the vehicle 1. The vehicle 1 traveling in a lane L1 makes a lane change to a lane L2 adjacent to the lane L1. It should be noted that the lane change here includes not only steering control but also turn signal flashing. The control device 100 flashes a turn signal indicating a direction to the lane L2 being a target lane of the lane change. Then, the control device 100 performs the steering control such that the vehicle 1 moves from the lane L1 to the lane L2 beyond a lane boundary LB.

The control device 100 performs the vehicle behavior control such that another vehicle around the vehicle 1 predicts or recognizes the lane change of the vehicle 1 more easily in the case of the low awareness state than in the case of the normal state. For example, the control device 100 increases "a lane change time" in the case of the low awareness state as compared with the case of the normal state. The lane change time is a target time from start to completion of the lane change, and is another example of the above-described motion calculation parameter. Since the lane change time becomes longer, the vehicle 1 gently makes the lane change. As a result, the behavior prediction easiness increases.

As another example, the control device 100 increases "a duration or a continuation range of the turn signal flashing" in the case of the low awareness state as compared with the case of the normal state. The duration or the continuation range of the turn signal flashing is still another example of the above-described motion calculation parameter. Due to increase in the duration of the turn signal flashing before start of the steering control, it becomes easier for the following vehicle 2 to predict the lane change of the vehicle 1. Due to increase in the continuation range of the turn signal flashing, it becomes easier for the following vehicle 2 to recognize the lane change of the vehicle 1. That is to say, the behavior prediction easiness increases.

As still another example, the control device 100 sets "a lane boundary distance DB" in the case of the low awareness state to be smaller than that in the case of the normal state. As shown in FIG. 9, the lane boundary distance DB is a distance between the vehicle 1 before starting the steering control for the lane change and the lane boundary LB. The lane boundary distance DB is still another example of the above-described motion calculation parameter. Due to decrease in the lane boundary distance DB, it becomes easier for the following vehicle 2 to predict the lane change of the vehicle 1. That is to say, the behavior prediction easiness increases.

3-4. Effect

As described above, the control device 100 performs the vehicle behavior control such that the behavior prediction easiness in the case of the low awareness state increases as compared with the case of the normal state. Due to increase in the behavior prediction easiness, another vehicle predicts or recognizes the behavior of the vehicle 1 with a higher degree of accuracy, and thus possibility that said another vehicle comes too close to the vehicle 1 and/or collides with the vehicle 1 decreases. Therefore, opportunity for the autonomous driving system 10 mounted on the vehicle 1 to issue the operation request or the monitoring request to the driver decreases. As a result, need for the operation or monitoring by the driver decreases.

4. Increase in Safety Margin

Next, let us describe the standpoint (2) shown in FIG. 2 in more detail. The control device 100 (the vehicle behavior control device 30) performs the vehicle behavior control such that the safety margin for a surrounding object becomes larger in the case of the low awareness state than in the case of the normal state. In other words, the control device 100 increases the safety margin in the case of the low awareness state as compared with the case of the normal state. Hereinafter, various examples for increasing the safety margin will be described.

4-1. First Example

When calculating the vehicle behavior plan (see Step S50 in FIG. 7), the control device 100 determines a travel lane in which the vehicle 1 is to travel. For example, each lane is given a score as a criterion for determining the travel lane. A setting value of the score is still another example of the above-described motion calculation parameter. By adjusting the setting value of the score, it is possible to actively eliminate a certain lane from the travel lane.

In the case of the low awareness state, the control device 100 preferably eliminates a lane close to a surrounding object from the travel lane. The lane close to a surrounding object is exemplified by a lane adjacent to a wall, a lane adjacent to a congested lane, a bidirectional lane, and so forth. Since the lane close to a surrounding object is eliminated from the travel lane, the safety margin increases.

4-2. Second Example

The control device 100 sets "an inter-vehicle distance to a surrounding vehicle" in the case of the low awareness state to be larger than that in the case of the normal state. The surrounding vehicle includes a preceding vehicle, a following vehicle, and an adjacent vehicle. The inter-vehicle distance is still another example of the above-described motion calculation parameter. Since the inter-vehicle distance increases, the safety margin increases.

4-3. Third Example

When a preceding vehicle ahead of the vehicle 1 decelerates, the control device 100 decelerates the vehicle 1. The control device 100 sets a deceleration start timing in the case of the low awareness state to be earlier than that in the case of the normal state. It is possible to hasten the deceleration start timing by increasing a setting value of the inter-vehicle distance to the preceding vehicle or by decreasing the target deceleration. Since the deceleration start timing becomes earlier, the safety margin increases.

4-4. Fourth Example

In a fourth example, let us consider a case where the vehicle 1 makes a lane change (see FIG. 9). The control device 100 determines whether a lane change to the lane L2 is possible or not, based on the sensor-detected information 53 (specifically, the target information and the vehicle speed information). For example, when a relative distance to the following vehicle 2 traveling in the lane L2 is equal to or less than a threshold, the control device 100 determines that the lane change is not possible. As another example, when a distance between two vehicles traveling in the lane L2 is equal to or less than a threshold, the control device 100 determines that the lane change into a space between the two vehicles is not possible.

The control device 100 sets a "lane changeable condition" in the case of the low awareness state to be stricter than in the case of the normal state. The lane changeable condition is a condition for determining that the lane change is possible, and is still another example of the above-described motion calculation parameter. Since the lane changeable condition becomes harder to satisfy, an unreasonable lane change is prevented from occurring. As a result, the safety margin increases.

In some cases, the following vehicle 2 comes closer to the vehicle 1 after the vehicle 1 starts the lane change. If a "lane change abort condition" is satisfied, the control device 100 aborts the lane change and makes the vehicle 1 go back to the lane L1. The control device 100 may ease the lane change abort condition in the case of the low awareness state as compared with the case of the normal state. Since the lane change abort condition becomes easier to satisfy, an unreasonable lane change is prevented from occurring. As a result, the safety margin increases.

4-5. Effect

As described above, the control device 100 performs the vehicle behavior control such that the safety margin for the surrounding object becomes larger in the case of the low awareness state than in the case of the normal state. Due to increase in the safety margin for the surrounding object, possibility of collision with the surrounding object is reduced. Therefore, opportunity for the autonomous driving system 10 to issue the operation request or the monitoring request to the driver decreases. As a result, need for the operation or monitoring by the driver decreases.

5. Reduction of Potential Collision Risk

Next, let us describe the standpoint (3) shown in FIG. 2 in more detail. The control device 100 (the vehicle behavior control device 30) performs the vehicle behavior control such that the potential collision risk is reduced in the case of the low awareness state as compared with the case of the normal state.

For example, in a situation where a merge lane merges with a first lane of a main line, collision occurrence probability is potentially high near the lane merging point in the first lane. Therefore, in the case of the low awareness state the control device 100 preferably exclude the first lane near the lane merging point from the travel lane. Traveling in a lane other than the first lane near the lane merging point can reduce the potential collision risk.

As another example, in the case of the low awareness state, the control device 100 calculates the vehicle behavior plan such that the number of lane changes is as small as possible. As a result, the potential collision risk is reduced.

As still another example, in the case of the low awareness state, the control device 100 decreases a travel speed of the vehicle 1. As a result, the potential collision risk is reduced.

In this manner, the control device 100 performs the vehicle behavior control such that the potential collision risk is reduced in the case of the low awareness state as compared with the case of the normal state. Accordingly, opportunity for the autonomous driving system 10 to issue the operation request or the monitoring request to the driver decreases. As a result, need for the operation or monitoring by the driver decreases.

6. Increase in Emergency Stop Easiness

Next, let us describe the standpoint (4) shown in FIG. 2 in more detail. When an emergency (e.g. mechanical trouble of the vehicle 1, abnormality of the autonomous driving system 10) occurs, the control device 100 requests the driver to start the manual driving operation. However, in the case of the low awareness state where the driver may not respond to the manual driving request, the autonomous driving system 10 brings the vehicle 1 to an emergency stop without issuing the manual driving request.

In view of the above, in the case of the low awareness state, the control device 100 (the vehicle behavior control device 30) selects a travel lane in which the vehicle 1 can be easily brought to a stop in case of the emergency. For example, the control device 100 selects a lane adjacent to a road shoulder as the travel lane. As another example, the control device 100 can select a lane with a low speed limit as the travel lane. As still another example, the control device 100 can select, as the travel lane, a lane where low-speed travel is allowed such as a slower traffic lane. As still another example, the control device 100 can select a lane with a low vehicle density as the travel lane.

In this manner, in the case of the low awareness state, the control device 100 performs the vehicle behavior control such that the emergency stop easiness increases as compared with the case of the normal state. As a result, even if the emergency occurs, it is possible to easily bring the vehicle 1 to a stop without relying on the driver's manual driving. Therefore, need for the operation or monitoring by the driver decreases.

7. Reduction of Control Error

Next, let us describe the standpoint (5) shown in FIG. 2 in more detail. If a control error in the vehicle behavior control increases, driver intervention becomes more likely to be required. For example, if the vehicle 1 greatly deviates from a planned trajectory, the driver intervention is required.

In view of the above, in the case of the low awareness state, the control device 100 (the vehicle behavior control device 30) changes a control gain such that the control error in the vehicle behavior control is reduced. For example, the control device 100 changes the control gain such that convergence performance and responsiveness to disturbance increase at the expense of ride quality. As a result, possibility of the driver intervention due to the control error decreases. That is, need for the operation or monitoring by the driver decreases.

It should be noted that recognition information such as the position-orientation information 51 and the sensor-detected information 53 may include an error. In consideration of such a recognition error, it is also possible in the case of the low awareness state to perform the lane change gently or hasten the deceleration start timing, as described in the above examples. As a result, need for the operation or monitoring by the driver decreases.

What is claimed is:
1. An autonomous driving system mounted on a vehicle and comprising:
a vehicle behavior control device configured to perform vehicle behavior control that controls behavior of the vehicle; and an awareness level calculation device configured to calculate an awareness level of a driver of the vehicle, a low awareness state being a state where the awareness level is lower than a normal state, wherein the vehicle behavior control device performs the vehicle behavior control such that another vehicle around the vehicle predicts or recognizes the behavior of the vehicle more easily in a case of the low awareness state than in a case of the normal state, wherein the vehicle behavior control device performs the vehicle behavior control such that said another vehicle predicts or recognizes a lane change of the vehicle more easily in the case of the low awareness state than in the case of the normal state, wherein the vehicle behavior control device performs steering control such that the vehicle moves to an adjacent lane beyond a lane boundary during the lane change, a lane boundary distance is a distance between the vehicle before starting the steering control and the lane boundary, and the vehicle behavior control device sets the lane boundary distance in the case of the low awareness state to be smaller than that in the case of the normal state.

2. The autonomous driving system according to claim 1, wherein a target acceleration or deceleration is a target value of an acceleration or deceleration of the vehicle in the vehicle behavior control, and the vehicle behavior control device sets the target acceleration or deceleration in the case of the low awareness state to be lower than that in the case of the normal state.

3. The autonomous driving system according to claim 1, wherein a deceleration start position is a position to start deceleration of the vehicle, and the vehicle behavior control device sets the deceleration start position in the case of the low awareness state to be in front of that in the case of the normal state.

4. The autonomous driving system according to claim 1, wherein a lane change time is a target time from start to completion of the lane change, and the vehicle behavior control device increases the lane change time in the case of the low awareness state as compared with the case of the normal state.

5. The autonomous driving system according to claim 1, wherein the lane change includes turn signal flashing, and the vehicle behavior control device increases a duration or a continuation range of the turn signal flashing in the case of the low awareness state as compared with the case of the normal state.

* * * * *